(12) United States Patent
Pezzutti et al.

(10) Patent No.: US 8,076,429 B2
(45) Date of Patent: Dec. 13, 2011

(54) SUPERTRANSPARENT HIGH IMPACT STRENGTH RANDOM BLOCK COPOLYMER

(75) Inventors: José Pezzutti, Mendoza (AR); Alberto Benito, Mendoza (AR); Guillermo Cassano, Mendoza (AR); Leandro Roth, Mendoza (AR); Werner Schoene, Schriesheim (DE); Hartmut Siebert, Alkoven Strassham (AT); Andreas Winter, Neuleiningen (DE); Anita Dimeska, Cincinnati, OH (US); Vassilios Galiatsatos, Lebanon, OH (US)

(73) Assignee: Lummus Novolen Technology GmbH, Mannheim (DE)

( * ) Notice: Subject to any disclaimer, the term of this patent is extended or adjusted under 35 U.S.C. 154(b) by 350 days.

(21) Appl. No.: 12/381,382

(22) Filed: Mar. 11, 2009

(65) Prior Publication Data
US 2010/0234507 A1    Sep. 16, 2010

(51) Int. Cl.
C08F 2/00       (2006.01)
C08F 210/00     (2006.01)
C08F 4/00       (2006.01)

(52) U.S. Cl. ............................ 526/81; 526/348; 526/90

(58) Field of Classification Search .................. 526/348, 526/81, 90
See application file for complete search history.

(56) References Cited

U.S. PATENT DOCUMENTS

| | | | |
|---|---|---|---|
| 4,376,062 | A | 3/1983 | Hamer et al. |
| 4,379,758 | A | 4/1983 | Wagner et al. |
| 5,045,589 | A | 9/1991 | Ueno |
| 5,066,737 | A | 11/1991 | Job |
| 7,169,864 | B2 | 1/2007 | Paczkowski et al. |
| 7,390,575 | B2 * | 6/2008 | Tayano et al. ............ 428/515 |
| 2006/0160942 | A1 | 7/2006 | Kanzaki |
| 2006/0235159 | A1 | 10/2006 | Datta et al. |

FOREIGN PATENT DOCUMENTS

| | | |
|---|---|---|
| EP | 373660 | 2/1996 |
| EP | 0602512 | 3/1997 |
| EP | 0911365 | 4/1999 |
| EP | 814127 | 8/2001 |
| EP | 0863183 | 4/2002 |
| EP | 860457 | 4/2003 |
| EP | 1162213 | 2/2004 |
| EP | 0716121 | 6/2004 |
| EP | 1428853 | 6/2004 |
| EP | 1206499 | 7/2004 |
| EP | 1354901 | 3/2006 |
| JP | 2005314621 A | 11/2005 |
| JP | 2008144163 A | 6/2008 |
| JP | 2008156562 A | 7/2008 |
| WO | WO 03/046021 | 6/2003 |
| WO | WO 03/106553 | 12/2003 |

OTHER PUBLICATIONS

International Search Report and Written Opinion issued Sep. 29, 2010 in corresponding International Application No. PCT/US2010/026205 (6 pages).
Abstract of JP2008156562 from espacenet.com (1 page), (2008).
Abstract of JP2005314621 from espacenet.com (1 page), (2005).
Abstract of JP2008144163 from espacenet.com (1 page), (2008).
International Preliminary Report on Patentability issued Sep. 13, 2011 in International application No. PCT/US2010/026205 (4 pages).

* cited by examiner

*Primary Examiner* — William Cheung
(74) *Attorney, Agent, or Firm* — Osha • Liang LLP

(57) ABSTRACT

A high impact strength random block copolymer including (a) about 65-97 wt. % of a crystalline propylene/ethylene copolymer A containing from about 0.5 wt. % to about 6 wt. % derived from ethylene and from about 94 wt. % to about 99.5 wt. % derived from propylene, and (b) about 3-35 wt. % of a propylene/ethylene copolymer B containing from about 8 wt. % to about 40 wt % derived from ethylene and from about 60 wt % to about 92 wt. % derived from propylene. The crystalline to amorphous ratio Lc/La of the random block copolymer ranges from about 1.00 to about 2.25. The random block copolymer is characterized by both high toughness and low haze.

13 Claims, No Drawings

SUPERTRANSPARENT HIGH IMPACT STRENGTH RANDOM BLOCK COPOLYMER

BACKGROUND

1. Field of the Invention

The present invention relates to transparent high impact random block copolymers compositions for use in molded and extruded articles.

2. Background of the Art

A variety of transparent thermoplastic compositions have been developed, some of which have been disclosed in the patent literature and/or introduced to the marketplace. Each of those compositions has a particular level of transparency, often characterized in terms of "haze," which is determined in accordance with recognized test procedures. Shortcomings of those compositions include unsatisfactorily high haze values (low transparency), poor processability and poor mechanical properties, including undue hardness, low flexibility, etc. For example, previously proposed thermoplastic elastomer compositions with transparency and flexibility such as compounds based on styrene-ethylene-butadiene-styrene impact copolymers, thermoplastic vulcanized blends (TPV) or thermoplastic olefin (TPO) blends show transparency and softness levels that are still unsatisfactory in some applications.

EP 1,428,853 discloses a polypropylene polymer composition including a random propylene-alpha-olefin copolymer, the alpha-olefin being ethylene and one or more $C_4$-$C_{10}$ alpha-olefins. The polymer includes a matrix phase containing 2-12 mole % ethylene and a rubber phase containing 25-65 mole % ethylene.

EP 1,354,901 discloses a heterophasic polypropylene composition with a MFR greater than 100 g/10 min.

WO 03/106,553 discloses high impact polypropylene copolymers with matrix and rubber present in separate phases.

WO 03/046,021 discloses a polypropylene polymer composition having a MFR of from 3 to 30 g/10 min. The polymer includes 50-90% of one or more propylene copolymers having a xylene insoluble fraction of not less than 85% and 10-50% of a propylene copolymer containing 8%-40% ethylene and optionally 1-10 w-% of a $C_4$-$C_8$ alpha-olefin.

Other random block copolymer compositions are disclosed in EP 1,206,499, EP 373,660, EP 814,127, EP 860,457 and EP 1,162,213.

Others have attempted to make transparent compositions, but many of such compositions are problematic, particularly when attempting to make molded compositions that possess a desirable combination of properties, such as softness, flexibility and strength, while also having good processability. For example, others have been confronted with shortcomings in the area of processability, particularly for molded or extruded compositions, where the tendency of a material to crystallize quickly has enormous advantages. Many materials that have good mechanical properties lack good crystallization properties. When a composition is used for molding, it is desirable that it has a tendency to flow well and thus quickly and easily and completely fill all areas of the mold. While there is a general tendency for higher MFR materials to correspond to good flowability, a higher MFR is frequently also accompanied by an unfortunate decrease in mechanical properties; thus a higher MFR is not necessarily desirable for that reason. Furthermore, many compositions experience a trade-off in properties, e.g., where good mechanical properties may be offset by poor flexibility, e.g., undue stiffness or hardness. Accordingly, there is a need for a material that has a combination of desirable properties.

Typically, in the past one had to choose between low haze or good impact properties. The prior art does not provide a material with both low haze and good impact properties at the same time.

SUMMARY

A super transparent high impact strength random block copolymer is provided herein which comprises a combination of (a) 65-97 wt., preferably 75-97 wt. % of a crystalline propylene/ethylene copolymer A containing from about 0.5 wt. % to about 6 wt. % derived from ethylene and from about 94 wt. % to about 99.5 wt. % derived from propylene, having a melting point of 120-159° C.; and (b) 3-35 wt. %, preferably 3-25 wt. %, of a propylene/ethylene copolymer B containing from about 8 wt. % to about 40 wt. % derived from ethylene and from about 60 wt. % to about 92 wt. % derived from propylene, where the random block copolymer is produced in at least a two stage reactor cascade, where copolymer A is produced in a first polymerization reactor and copolymer B is produced in a second polymerization reactor.

The random block copolymer is characterized by an outstanding combination of high impact strength and low haze.

DETAILED DESCRIPTION

Other than in the working examples or where otherwise indicated, all numbers expressing amounts of materials, reaction conditions, time durations, quantified properties of materials, and so forth, stated in the specification are to be understood as being modified in all instances by the term "about."

It will also be understood that any numerical range recited herein is intended to include all sub-ranges within that range.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

The present invention provides low haze (super transparent) random block copolymers for applications such as injection molding, sheet, film, thermoforming, blow molding and injection stretch blow molding (ISBM) by carefully tailoring of molecular parameters.

Such parameters include:

1) the proper melt flow rate difference (delta MFR) between the products produced in the first (copolymer A) and second polymerization reactor (copolymer B),
2) the proper ethylene content of copolymer A, produced in the first reactor,
3) the proper ethylene content of copolymer B, produced in the second reactor,
4) the balance of the ethylene contents of copolymers A and B,
5) the balance of long spacing within the crystalline structure of the random impact copolymer,
6) the xylene soluble (XS) content of the random block copolymer, and
7) optionally adding a clarifier in the right amount to the random impact copolymer.

Careful control and balancing of these parameters results in the growth of crystalline regions of a certain size and type, resulting in a random block copolymer that has an unexpectedly low haze, which is desirable yet previously thought to be impossible for impact copolymers.

Although not wishing to be limited to any theory, the low haze is believed to be the result of properly formed crystalline domains of smaller size and type than those found in typical impact copolymers. This behavior is believed to be attributable to co-crystallization of rubber polymer chains within the matrix polymer chains. Low haze may also be attributed to the optimization of refractive index between the two phases. Smaller, more open spherulites with irregular borders in combination with very small rubber particles (D<0.5 microns) are believed to provide a mechanism for obtaining the combination of low haze and good impact properties in the random block copolymer of the invention. Also, low molecular weight (LMW) compatible rubber tends to migrate to the matrix domain thereby thickening the amorphous lamella (La) and thinning the crystalline lamella (Lc).

In more detail, in one embodiment of the invention a random block copolymer is provided herein which comprises a combination of:

(a) 65-97 wt. % of a crystalline propylene/ethylene copolymer A containing from about 0.5 wt. % to about 6 wt. % derived from ethylene and from about 94 wt. % to about 99.5 wt. % derived from propylene, having a melting point (measured by means of DSC in accordance with the standard ISO 3146) of 120-159° C.; and (b) 3-35 wt. % of a propylene/ethylene copolymer B containing from about 8 wt. % to about 40 wt. % derived from ethylene and from about 60 wt. % to about 92 wt. % derived from propylene, where the random block copolymer has the following properties:

(i) the propylene/ethylene copolymer B is dispersed in the crystalline propylene/ethylene copolymer A; in a first embodiment of the invention, the two copolymers A and B are phase separated and in a second embodiment of the invention, the copolymers A and B form a continuous phase random block copolymer without phase separation, (ii) in the case, the two copolymers A and B form a random block copolymer showing phase separation, the particle size of the dispersed polymer B is <1.5 µm, preferably <1.0 µm, particularly preferably <0.5 µm, (iii) the haze, measured in accordance with the standard ASTM D 1003 is for random block copolymers of the present invention <12%, preferably <10%, and particularly preferably <7%.

(iv) the Xylene soluble fraction (XS) at 23° C., measured in accordance with ISO Standard 16152 (Plastics-Determination of Xylene soluble matter in Polypropylene) is 11% to about 25%, preferably 12 to about 22, particularly 15% to about 20%, (v) the MFR measured in accordance with the ISO standard 1133 at 230° C. with a load of 2.16 kg is 0.1 to about 150 dg/min, preferably 0.5 to about 100 dg/min, particularly preferably 1 to about 80 dg/min, (vi) the ratio of powder-$MFR_{random\ block\ copolymer}$ to the powder-$MFR_{copolymer\ A}$ are in accordance with the equation $$MFR_{random\ block\ copolymer} = K(MFR_{copolymer\ A})$$

wherein K=1.0 to about 1.5, preferably 1.0 to about 1.3, particularly preferably 1.0 to about 1.25, (vii) the crystalline/amorphous ratio Lc/La, determined by small angle X-ray scattering (SAXS), ranges from about 1.00 to about 2.25, preferably 1.25 to about 2.00, particularly preferably 1.40 to about 1.70, (viii) the material optionally contains nucleating and/or clarifying agents ranging from about 50 ppm to about 5,000 ppm, preferably from about 100 to about 4,000 ppm, and more preferably from about 120 to about 2,500 ppm.

Preferably, in another embodiment the random block copolymer of the present invention comprises a combination of:

(a) 75-95 wt. % of a crystalline propylene/ethylene copolymer A containing from about 1.0 wt. % to about 5 wt. %, preferably 1.5 to about 4.5 wt. %, derived from ethylene and from about 95 wt. % to about 99 wt. %, preferably 95.5 to about 98.5 wt. %, derived from propylene, having a melting point of 135-150° C., preferably of 139-146° C.; and (b) 5-25 wt. % of a propylene/ethylene copolymer B containing from about 10 wt. % to about 30 wt. %, preferably 12 to about 25 wt. %, derived from ethylene and from about 70 wt. % to about 90 wt. %, preferably 75 to about 88 wt. %, derived from propylene, where the random block copolymer has the above mentioned properties (i)-(viii).

Particularly preferably, in yet another embodiment the random block copolymer of the present invention comprises a combination of:

(a) 80-92 wt. % of a crystalline propylene/ethylene copolymer A containing from about 1.5 wt. % to about 4.5 wt. %, preferably 2.0 to about 4.0 wt. %, derived from ethylene and from about 95.5 wt. % to about 98.5 wt. %, preferably 96 to about 98 wt. %, derived from propylene, having a melting point of 135-150° C., preferably of 139-146° C.; and (b) 8-20 wt. % of a propylene/ethylene copolymer B containing from about 10 wt. % to about 30 wt. %, preferably 12 to about 25 wt. %, derived from ethylene and from about 70 wt. % to about 90 wt. %, preferably 75 wt. % to about 88 wt. %, derived from propylene, where the random block copolymer has the above mentioned properties (i)-(viii).

Most preferably, in yet another embodiment the random block copolymer of the present invention comprises a combination of (a) 88-92 wt. % of a crystalline propylene/ethylene copolymer A containing from about 2.0 to about 4.0 wt. %, derived from ethylene and from about 96 to about 98 wt. %, derived from propylene, having a melting point of 139-146° C.; and (b) 8-12 wt. % of a propylene/ethylene copolymer B containing from about 12 to about 17 wt. %, derived from ethylene and from about 83 to about 88 wt. %, derived from propylene, where the random block copolymer has the above mentioned properties (i)-(viii).

The polymers of the invention can be produced using any coordinating catalyst, like single-site catalysts or Ziegler-Natta catalysts, the Ziegler-Natta catalyst being preferred.

The method of the present invention includes preparing a random block copolymer by sequential polymerization. Ethylene and propylene are copolymerized in a first reaction zone to provide a propylene-ethylene copolymer component A of the impact copolymer of the invention. Component A is then sent to a second reaction zone where ethylene and propylene are copolymerized to provide the component B which is incorporated into the polymer. The ethylene content of component A can range from about 0.5 wt. % to about 6 wt. % and the propylene content can range from 94 wt. % to about 99.5 wt. %. Component B of the impact copolymer contains from about 8 wt % to about 40 wt. % of ethylene and 60 wt. % to about 92 wt. % of propylene.

Random block copolymers of the present invention can be produced in slurry polymerization processes conducted in inert hydrocarbon solvents, bulk polymerization processes conducted in liquefied propylene, in gas phase polymerization processes or in processes, where the above mentioned processes are combined. As an example., in a first step copolymer A can be produced in a bulk process and copolymer B can be produced in a gas phase process. Gas phase processes with a fluidized or stirred bed are preferable, especially a two reactor system wherein the copolymer A is made in the first reactor and the copolymer B in the second reactor. Such a process provides for in situ blending of the two copolymer components A and B to form a block copolymer, which is necessary, as compared to a physical blending of the copolymer components A and B which does not produce an impact copolymer of the present invention.

The catalysts for use in such systems include Ziegler-Natta catalysts and single site catalysts.

Ziegler-Natta catalysts, including titanium-based catalysts, are described in U.S. Pat. Nos. 4,376,062, 4,379,758 and 5,066,737. Ziegler-Natta catalysts typically are magnesium/titanium/electron donor complexes, optionally supported on a suitable support like silica, used in conjunction with an organoaluminum cocatalyst and an external selectivity control agent such as an aromatic carboxylic acid ester or an alkoxy silane compound.

Single site catalysts, e.g., metallocene catalysts, comprise organometallic coordination complexes of one or more ligands in association with a metal atom and are described, for example, in U.S. Pat. No. 7,169,864.

In accordance with the process, discrete portions of the catalyst components are continuously fed to the reactor in catalytically effective amounts together with the monomers propylene and ethylene while the polymer product is continuously removed during the continuing process. Polymerization technologies useful for this purpose are described e.g., in Polypropylene Handbook, 2nd edition, p. 361 ff. (Hanser Publishers, Munich 2005).

The polymerization is generally carried out at temperatures of from 20 to 150° C. and at pressures of from 1 to 100 bar, with average residence times of from 0.5 to 5 hours, preferably at temperatures of from 60 to 90° C. and at pressures of from 10 to 50 bar, with average residence times of from 0.5 to 3 hours. The polymerization can be carried out batchwise or, preferably, continuously.

For example, in the first reactor a mixture of propylene and ethylene is introduced together with hydrogen, catalyst, organoaluminum cocatalyst and external selectivity control agent. The amount of hydrogen to the combined monomers propylene and ethylene is in the range of about 10 to about 200 g hydrogen/metric ton (mt) monomers, preferably about 20 to about 100 g hydrogen/mt monomers, most preferably about 30 to about 60 g hydrogen/mt monomers if a Ziegler-Natta catalyst is used or in the range of about 0.05 to about 20 g hydrogen/mt monomer and is preferably about 0.1 to about 10 g hydrogen/mt monomer if a metallocene catalyst is used.

A mixture of copolymer A with active catalyst embedded in the polymer matrix is produced in the first reactor. This mixture from the first reactor is transferred to the second reactor to which no additional solid catalyst need be added. Additional cocatalyst and/or external selectivity control agent optionally may be added to the second reactor. In the second reactor, propylene and ethylene are maintained at a gas phase composition in a range of mole ratio of about 0.10 to about 0.50 moles of ethylene per mole of propylene, and preferably about 0.12 to about 0.30 moles of ethylene per mole propylene. In order to regulate the molecular weight of the copolymer B, hydrogen ($H_2$) is introduced in the second reactor in an amount of 100-500 g/mt of propylene, preferably 200-400 g/mt of propylene and most preferably 250-350 g/mt of propylene. Such a process creates the random block copolymer of the present invention containing the copolymer A and the copolymer B.

The random block copolymer of the invention preferably contains a clarifying agent in an amount ranging from about 50 ppm to about 5,000 ppm, preferably from about 100 to about 4,000 ppm, and more preferably from about 120 to about 2,500 ppm.

Of such clarifying agents, dibenzylidene sorbitol type clarifying agents are preferred, including, but not limited to, dibenzylidene sorbitol clarifiers having alkyl, alkoxy or halogen substituents on either or both aromatic rings, whereby the alkyl substituents can be $C_1$ to $C_{20}$, and may be branched, linear or cycloalkyl, and combinations of such sorbitol derivatives. Some specific examples of same are bis(3,5-dimethyl benzylidene)sorbitol, bis(p-ethyl benzylidene)sorbitol, bis(p-methyl benzylidene)sorbitol and combinations thereof. Such clarifying agents are commercially available as MILLAD 3940 and 3988 from Milliken Chemical Co. of Spartanburg, S.C.; NC-4 from Mitsui Toatsu Chemicals, Inc. of Tokyo, Japan; Uniplex CX 45-56 from Unitex Chemical Corp., Greensboro, N.C.; and Geniset MD from New Japan Chemical Co., Tokyo, Japan.

Other possible clarifying agents are Millad NX 8000 (Milliken Co); Irgaclear XT 386 (Ciba Specialty Chemicals Inc., Basel, Switzerland); Ricaclear PC 1 (Rika International, Manchester, UK); ADK-STAB NA-21 and ADK-STAB NA-71 (Asahi Denka, Tokyo, Japan).

The compositions of the invention may also contain additives such as thermal stabilizers, antioxidants, lubricants, acid scavengers, synergists, anti-static agents, nucleating additives and additives which stabilize against radiation, such as ultraviolet (UV) stabilizers and those that provide resistance to gamma irradiation.

Antioxidants include the sub-classes of primary and secondary antioxidants; examples of primary antioxidants include the phenolic-type additives typified by IRGANOX 1010, IRGANOX 3114 (Ciba) or ETHANOX 330 (Albemarle). Their main function is to provide long-term thermal stability such as is usually needed in fabricated articles.

The class of secondary antioxidants includes additives that contain phosphorus in either organophosphite or organophosphonite configurations. Examples of such phosphites include IRGAFOS 168 or IRGAFOS 12 (Ciba), ULTRANOX 626, ULTRANOX 627A, ULTRANOX 641 (Chemtura), DOVERPHOS S-9228 (Dover Chemical Co.).

Organophosphonite secondary antioxidants are typified by IRGAFOS P-EPQ (Ciba). Other secondary antioxidants are exemplified by lower molecular weight phenolic-types such as BHT or IRGANOX 1076, or high molecular weight hydroxyl amines such as IRGASTAB FS 042 (Ciba). Secondary antioxidants function mainly by providing stability in melt flow and color during the melt processing of the plastic material. Another class of secondary antioxidants comprises the benzofuranone (lactone) derivatives as represented by IRGANOX HP-136 (Ciba).

Lubricants or mold release agents are typified by fatty acid amides, examples of which include ethylene bis-(stearamide, oleamide and erucamide).

Acid scavengers may be categorized as salts of fatty acids, e.g. stearic acid or lactic acid salts and related derivatives, hydrotalcite-like compounds, and certain metal oxides. Examples of each type in order include calcium stearate, zinc stearate, calcium lactate, DHT-4A (Kyowa Chemical Co. Tokyo, Japan), and zinc or magnesium oxides. Synergists enhance the performance of primary antioxidants. Examples include the thioesters of fatty acids typified by Di-stearylthio-dipropionate (DSTDP), Di-lauryl-thio-dipropionate (DLTDP) and Di-myristyl-thio-dipropionate (DMTDP).

Anti-static agents enhance static charge decay on molded parts. Key examples include glyceryl monostearate and glyceryl distearate, as well as mixtures thereof.

Nucleating additives are typically benzoic acid salts such as sodium, lithium or aluminum benzoate, minerals such as micronized talc, and organophosphorous salts such as ADK-STAB NA-11 or ADK-STAB NA-25 (Asahi Denka).

Ultraviolet stabilization is provided by light absorbers such as TINUVIN 327 (Ciba) or by hindered amine type stabilizers such as CYASORB 3346 (Cytec Industries Inc.), TINUVIN 622, TINUVIN 770 DF or CHIMASSORB 944 (Ciba).

Resistance against gamma irradiation is provided by combinations of additives such as phosphorous-containing secondary antioxidants and hindered amines. Additionally, Milliken's RS 200 additive is of benefit, as are other mobilizing additives such as mineral oil (cited in U.S. Pat. Nos. 4,110,185 and 4,274,932).

Preferred antioxidants include 1,3,5-trimethyl-2,4,6-tris (3,5-di-tert-butyl-4-hydroxy-benzyl)benzene (A); octadecyl 3-(3',5'-di-tert-butyl-4'-hydroxyphenyl)propionate (B); tetrakis[methylene(3,5-di-tert-butyl-4-hydroxyhydrocinnamate)]methane (C); tris[3,5-di-t-butyl-4-hydroxybenzyl) isocyanurate (D); 3,5-di-tert-butyl-4-hydroxyhydrocinnamic acid triester with 1,3,5-tris(2-hydroxyethyl)-s-triazine-2,4,6 (1H,3H,5H)-trione (E); 1,3,5-tris-(4-tert-butyl-3-hydroxy-2,6-dimethylbenzyl) 1,3,5-triazine-2,4,6-(1H,3H,5H)-trione (F); bis-[3,3-bis(4-hydroxy-3-tert-butyl-phenyl)-butanoic acid]-glycolester (G); 2,2'-methylene-bis-(4-methyl-6-tertiary-butylphenol)-terephthalate (H); and 2,2 bis[4-(2-(3,5-di-tert-butyl-4-hydroxyhydrocinnamoyloxy))ethoxy-phenyl]propane (1); calcium bis[monoethyl(3,5-di-tert-butyl-4-hydroxybenzyl)phosphonate](J); 1,2-bis(3,5-di-tert-butyl-4-hydroxyhydrocinnamoyl)hydrazine (K); and 2,2-oxamido bis[ethyl 3-(3,5-di-tert-butyl-4-hydroxyphenyl)propionate] (L).

Additional additives may be used separately or blended with the above listed antioxidants. This applies to all the above additive types and further includes fillers like talc, calcium carbonate, barium sulfate, clays, silicates, pigments, such as titanium dioxide, zinc oxide, lead chromate, cadmium sulfides, cadmium selenide, zinc sulfide, basic carbonate of white lead; flame retardants such as antimony oxide; ultraviolet stabilizers, slip agents, anti-impact agents, and other additives which enhance the properties and processability of the random block copolymer to which they are added.

While the above listing seeks to provide key examples of the different additive types, it is not to be viewed as limited by the examples in scope. It is also recognized that certain of the above additives are multi-functional, e.g., an acid acceptor such as calcium stearate may also provide mold release performance, as may also be the case with glycerol monostearate. Further, combinations of any or all types of additives given, or of additives within a given class, are considered to be within the scope of the present invention.

The random impact block copolymer of the present invention may be subjected to a chemical degradation treatment (visbreaking or clipping) according to processes well known in the art, in order to improve the flowability and to obtain the required MFR values (measured according to ISO standard 1133). The chemical degradation of the copolymer is carried out in the presence of a free radical initiator, such as organic peroxide. Examples of free radical initiators that can be used for this purpose are e.g. Di-t-butyl-peroxide, (2,5-Dimethyl-2,5-ditert-butylperoxy)-hexane or 3,6,9-Triethyl-3,6,9-trimethyl-1,4,7-triperoxononane.

The random block copolymers of the present invention may be used in any standard molded products in which similar polyolefin resins and conventional polypropylene impact copolymers are used. However, the added advantage of good stiffness and high toughness in combination with outstanding clarity expands this range of utility over standard impact copolymers, such that the random block copolymers of the present invention can be used in food and non-food containers, drinking cups, water bottles, caps & closures, medical devices and toys where the need for clarity otherwise restricts use to either random propylene-ethylene copolymers of inherently lower toughness or to other polymers such as polycarbonate, which while tough, are several times more expensive. The need for toughness at freezer temperatures, combined with stiffness and clarity, is met by the materials of this invention at lower cost.

According to the present invention, random block copolymers with low hot hexane solubles content, determined in accordance with FDA 177.1520, can be produced, enabling them to be used for cooking applications. In addition, according to the present invention, random block copolymers can be produced which can be sterilized for medical application by steam autoclaving or gamma irradiation. In addition, such grades can be used for microwave heating and cooking.

METHODS

The following test methods were used in the Examples given below.

XS (Xylene Soluble Fraction) was determined at 23° C. according to ISO 16152.

Xylene solubles are defined as the percent by weight remaining in solution after the polymer sample is dissolved in hot Xylene and subsequent cooling down of the solution to 23° C. The difference between Xylene solubles after the second stage of polymerization and the first stage of polymerization largely correlates to the rubber content of the rubber content of the random block copolymers of the present invention.

MFR (Melt Flow Rate) was determined in accordance with ISO 1133 at 230° C. with a load of 2.16 kg. According to this measurement, the MFR refers to the weight of the polymer extruded through a standard cylindrical die at a standard temperature of 230° C. in a laboratory apparatus carrying a standard piston and load of 2.16 kg. The MFR is a measure of the melt viscosity of a polymer and hence of its molar mass.

Haze was determined in accordance with ASTM D 1003 using test specimens with a dimension of 6×6 cm and a thickness of 1 mm. These plates have been injection molded at a mold temperature of 210° C. and a tool surface temperature of 40° C. The tool has to be carefully polished to guarantee a glossy and scratch free surface of the test plates produced. After a storage time of 48 hours at room temperature to ensure the maximum possible crystallization of the polymer, the measurement was made at 23° C. using a Gretag Macbeth Color-Eye 7000A spectrophotometer. The test specimens are measured in the center of the plate. Haze is measured as a percentage of transmitted light that is scattered more than 2.5 degrees from the direction of the incident beam. The reported haze value is the average result of the individual haze values measured on three different plates. The lower the haze % numbers, the higher is the transparency of the test specimen. Materials with haze values greater than 30% are considered to be diffusing.

The glass transition temperature (Tg) was determined by means of torsional Dynamic Mechanical Analysis (DMA) on compression molded rectangular bars in accordance with ASTM D 4065-06. Temperature and frequency dependent tests were made using a Rheometrics Dynamic Analyzer RDA II. Pellet samples for each material were melted and moulded in form of a sheet of uniform thickness (1 mm) in a laboratory hot press at 200° C. and 20 MPa for 7 min, followed by cooling (inside the press) for 11 min; the cooling water temperature was 15° C.

The test specimens were cut from the compression molded sheets in the following dimensions: length 30 mm, width 10 mm, and thickness 1 mm. They were then kept at 23° C. and 50% r.h. for a minimum length of time of 88 h (ISO 291) before carrying out the measurements.

The samples were subjected to a sinusoidal strain of 0.3% (to ensure viscolelastic behavior) at a constant frequency of 1 rad/s. The temperature dependence of the dynamic mechanical loss tangent, tan δ, was measured from −150° C. up to 80° C. at an average heating rate of 3° C./min under a nitrogen atmosphere. Finally the glass transition temperature of each sample was defined as the peak of the tan δ curve as a function of temperature (tan δ is defined as the ratio of the loss modulus E" to the storage modulus E').

The melting point (Tm) was determined by DSC in accordance with ISO standard 3146 using a 5 mg polymer sample and applying a first heating step at a heating rate of 20° C./min up to 230° C. and a hold at 230° C. for 10 min, followed by a crystallization step with a cooling rate of 20° C./min from 200° C. to −20° C. with a hold at −20° C. of 10 min, followed by a second heating step at a heating rate of 20° C./min to 230° C. The reported melting point is the temperature, where the enthalpy of the second heating cycle displays the maximum. Instruments from Perkin Elmer (DSC 7) and TA Instruments (Q 1000 DSC) have been used after calibration with Indium under the above mentioned measurement conditions.

The hexane soluble content (HS) was determined in accordance with FDA 177.1520 by using 2 g of a respective film of 2 mil thickness made of the polymer. The film was extracted at 50° C. for 2 hours. After the extraction, the hexane extract was separated into a flask and the content of extracted polymer was gravimetrically determined after removal of the hexane under reduced pressure.

The ethylene content of the copolymers was determined by FT-IR (Fourier Transform Infra red Spectroscopy). The test method is suitable for the quantitative determination of the ethylene content in propylene-ethylene copolymers. The method employs calibrations based on sets of reference samples covering a suitable range of ethylene levels. The ethylene content of these reference samples was determined by $^{13}$C NMR.

A small amount of resin is placed in a spacer frame, sandwiched between polyester film, and molded into a film of 200±10 microns thickness at 210° C. and 200 bar for 10 min, then cooled down to <40° C. under pressure.

The test samples are then exposed to the probe of the FT-IR spectrometer and the spectra are recorded in the relevant wave number range (absorption bands of the ethylene in the impact copolymers: 720-730 cm$^{-1}$)

Spectra are transformed into the format suitable to be analysed by the chemometry software package. The chemometrical analysis of the FT-IR data results in the ethylene content of the sample in percent.

The impact strength was measured by notched or un-notched Charpy test on injection moulded specimens according to ISO 179-1 (*Plastics—Determination of Charpy impact properties Part* 1: *Instrumented impact test*)

Small Angle X-Ray Scattering (SAXS) was performed on injection-molded plaques to determine long spacing (Lp) crystalline spacing (Lc) and amorphous spacing (La) quantities in the tested copolymers. The spacing was obtained by profile fitting the peak in the SAXS data with a pseudo-Voigt function (Jade version 7, Materials Data Inc., Livermore, Calif.) in which the skew was refined. The background was determined by two straight lines determined by the high and low angle linear scattering limits. The data were collected on a line source system (Rigaku Ultima 3). The system was configured with a multilayer mirror, 0.03 micron first slit and second 1 mm slit set to reduce the parasitic scatter from the mirror and the beam defining slits. The diffracted beam side of the system consisted of a vacuum pathway, scatter slit of 0.2 mm and detector slit of 0.01 mm. Data were collected at 6 seconds/step with 0.005 degrees per step.

The tests indicated above were performed on Example 1, Comparative Examples A, B, and C, and the commercially available clarified random copolymers indicated herein.

EXAMPLES

Various features of the invention are illustrated by Example 1 below. The Comparative Examples and commercial products tested do not represent the invention but are presented for comparison purposes.

All products mentioned in Table 1 were produced by a stirred gas phase process in a reactor cascade consisting of two 25 m$^3$ gas phase reactors with helical stirrers.

Example 1 as well as the comparative examples A, B and C are random block copolymers, consisting of a crystalline propylene/ethylene copolymer A, produced in the first stirred gas phase reactor and a propylene/ethylene copolymer B, produced in the second stirred gas phase reactor of the cascade.

In the first reactor, a mixture of propylene and ethylene was introduced together with hydrogen, ZN-catalyst, organoaluminum cocatalyst and an external donor (Silane).

Temperature, pressure and the feed ratios for ethylene and hydrogen with respect to the propylene feed are given in Table 1. After an average residence time of 60 min, a mixture of copolymer A with active catalyst embedded in the polymer matrix was transferred to the second reactor without adding additional catalyst. In the second reactor, the polymerization of the copolymer B was taking place at reduced pressure and temperature (see table 1), again at a residence time of 60 min.

The products were stabilized stabilized/additivated by blending the polymer powder from the second reactor (powder MFR's between 1.7 and 2.5 as indicated in Table 1) with a combination of Irgafos 168 (secondary anti-oxidant), Irganox 1010 (primary anti-oxidant), Calcium stearate (acid scavenger), Glycerol monostearate (GMS) (anti-static agent) and Millad 3988 (clarifier).

They were subsequentially visbroken by 2,5-dimethyl-2, 5-di(tert-butylperoxy)hexane to MFR's between 12 and 15 (see Table 1) and pelletized on a Werner & Pfleiderer corotating double screw extruder.

TABLE 1

(Example 1, comparative examples A, B and C and commercial comparative examples 3240 NC and 3348 SC)
Polimerization Parameters

|  |  | Example 1 | Comp. Ex. A | Comp. Ex. B | Comp. Ex. C | 3240NC | 3348SC |
|---|---|---|---|---|---|---|---|
| 1st Reactor | | | | | | | |
| Pressure | Barg | 24 | 24 | 24 | 24 | 24 | 24 |
| Temperature | °C. | 75 | 75 | 75 | 75 | 75 | 75 |
| C2 Feed Ratio | Kg C2/tnC3 | 38 | 28 | 28 | 26 | 28 | 38 |
| H2 Feed Ratio | g H2/tnC3 | 44 | 40 | 40 | 32 | 38 | 46 |
| Powder C2 content | wt-% | 3 | 2.2 | 2.2 | 1.8 | 2.2 | 3 |
| Powder MFR | g/10 min | 1.4 | 1.95 | 1.95 | 1.3 | 1.8 | 1.5 |
| XS | % | 8.5 | 6.5 | 6.5 | 6.0 | 6.5 | 8.5 |
| 2nd Reactor | | | | | | | |
| Pressure | Barg | 12.5 | 12.5 | 12.5 | 12.5 | — | — |
| Temperature | °C. | 69 | 69 | 69 | 69 | — | — |
| C2 Feed Ratio | Kg C2/tnC3 | 50 | 50 | 50 | 80 | — | — |
| C3 Feed | Ton C3/h | 0.3 | 0.3 | 0 | 0 | — | — |
| H2 Feed Ratio | g H2/tnC3 | 295 | 160 | 160 | 530 | — | — |
| Powder MFR | g/10 min | 1.7 | 1.8 | 1.8 | 2.5 | — | — |
| $\Delta MFR_{R2-R1}$ | g/10 min | 0.3 | −0.15 | −0.15 | 1.2 | — | — |
| Final Product | | | | | | | |
| Final MFR pellets | g/10 min | 12 | 15 | 15 | 15 | 12 | 25 |
| Final XS | % | 17.2 | 15.5 | 16.2 | 20.6 | — | — |
| Ratio 1st/2nd Reactor | wt:wt | 91:9 | 91:9 | 90:10 | 85:15 | — | — |
| Final Product Properties | | | | | | | |
| Haze | % | 5.8 | 15 | 20 | 15 | 11 | 11 |
| Tg | °C. | −9 | −6 | −6 | −6/−50 | −5 | −5 |
| Tm | °C. | 142 | 147 | 146 | 151 | 150 | 145 |
| Hexane solubles | (%) | 4.2 | 4.2 | 3.8 | — | 2.2 | 3.2 |
| IS Charpy notched @ 23° C. | (KJ/m$^2$) | 29 | 11 | 11 | 40 | 6 | 6.3 |
| IS Charpy notched @ 0° C. | (KJ/m$^2$) | 5 | 6 | 6 | 8 | 2 | 3.5 |
| IS Charpy notched @ −20° C. | (KJ/m$^2$) | 1 | 1 | 1 | 1 | 1 | 1 |
| IS Charpy @ 23° C. | (KJ/m$^2$) | NB | NB | NB | NB | 200 | NB |
| IS Charpy @ 0° C. | (KJ/m$^2$) | NB | NB | NB | NB | 100 | 180 |
| IS Charpy @ −20° C. | (KJ/m$^2$) | NB | NB | NB | NB | 17 | 50 |
| Flexural Modulus | MPa | 590 | 700 | 710 | 770 | 1050 | 740 |

NB: without break

Example 1

Example 1 was produced in a two step process. In the first stage, a propylene/ethylene random copolymer with 3 wt-% ethylene content was polymerized in gas phase. In the second stage, a low molecular weight propylene/ethylene rubber, rich in propylene was polymerized.

In order to obtain a low molecular weight rubber, a proper amount of hydrogen was added to the second reactor. As a result of this, a K-value (the ratio of the second reactor powder MFR to the first reactor powder MFR) of 1.21 was achieved.

In order to have a rubber phase rich in propylene, an additional amount of propylene was injected in the second stage of polymerization.

The ratio between the propylene/ethylene random copolymer and the propylene/ethylene rubber in the final product was 91:9 (parts by weight).

The polymer powder obtained in the polymerization was admixed with a standard additive mixture in the extrusion step. The polymer was compounded in a twin screw extruder at 250° C. The polymer composition obtained contained 0.1% by weight of Irgafos 168 (from Ciba SC), 0.05% by weight of frganox 1010 (from Ciba SC), 0.11% by weight of Calcium Stearate (from Baerlocher), 0.06% by weight of Atmer 122 (from Ciba SC) and 0.2% by weight of Millad 3988 (from Milliken Chemical).

For visbreaking from the powder melt flow rate of 1.7 g/10 min to the final pellet melt flow rate of about 12 g/10 min, 2,5-dimethyl-2,5-di(tert-butylperoxy)hexane was used.

Other operative conditions and general properties of the produced polymer are indicated in Table 1 above.

COMPARATIVE EXAMPLES

Comparative Example A

Comparative Example A was produced in a two step process. In the first stage, a propylene/ethylene random copolymer with 2.2 wt-% ethylene was polymerized in gas phase. A composition of propylene/ethylene rubber similar to Example 1 was polymerized in the second stage. In this comparative example, a lower amount of hydrogen was injected, in order to obtain a higher molecular weight of the rubber phase. As a consequence, a K value (the ratio of the second reactor powder MFR to the first reactor powder MFR) lower than 1 was achieved.

The ratio between the propylene/ethylene random copolymer and the propylene/ethylene rubber was 91:9 (parts by weight).

The polymer powder obtained in the polymerization was admixed with a standard additive mixture in the extrusion step. The polymer was compounded in a twin screw extruder at 250° C. The polymer composition obtained contained 0.1% by weight of Irgafos 168 (from Ciba SC), 0.05% by weight of Irganox 1010 (from Ciba SC), 0.11% by weight of calcium stearate (from Baerlocher), 0.06% by weight of Atmer 122 (from Ciba SC) and 0.2% by weight of Millad 3988 (from Milliken Chemical).

For visbreaking from the powder melt flow rate of 1.8 g/10 min to the final melt flow rate of 15 g/10 min, 2,5-dimethyl-2,5-di(tert-butylperoxy)hexane was used.

In Comparative Example A, as a result of a lower amount of ethylene in the first stage composition (random copolymer) and a higher molecular weight in the second stage polymerization (rubber phase), the resulting haze was higher compared to the one achieved in Example 1.

Other operative conditions of the produced polymer are indicated in Table 1.

Comparative Example B

Comparative Example B was produced in a two step process. In the first stage, a propylene/ethylene random copolymer with 2.2 w-% ethylene was polymerized in gas phase. In this comparative example, the same amount of hydrogen was injected as in Comparative Example A, in order to obtain a similar molecular weight of the rubber phase (higher than in Example 1). As a consequence, a K-value lower than 1 was achieved.

Comparative Example B was produced without the injection of propylene in the second reactor, in order to achieve a different composition in the rubber phase.

The ratio between the propylene/ethylene random copolymer and the propylene/ethylene rubber was 90:10 (parts by weight).

The polymer powder obtained in the polymerization was admixed with a standard additive mixture in the extrusion step. The polymer was compounded in a twin screw extruder at 250° C. The polymer composition obtained contained 0.1% by weight of Irgafos 168 (from Ciba SC), 0.05% by weight of Irganox 1010 (from Ciba SC), 0.11% by weight of calcium stearate (from Baerlocher), 0.06% by weight of Atmer 122 (from Ciba SC) and 0.2% by weight of Millad 3988 (from Milliken Chemical).

For visbreaking from the powder melt flow rate of 1.8 g/10 min to the final melt flow rate of 15 g/10 min, 2,5-dimethyl-2,5-di(ter-butylperoxy)hexane was used.

In Comparative Example B, as a result of a lower amount of ethylene in the first stage composition (random copolymer), a higher molecular weight in the second stage polymerization (rubber phase), and a more incompatible rubber phase due to its chemical composition, the resulting haze was higher compared to the one achieved in Comparative Example A.

Other operative conditions of the produced polymer are indicated above in Table 1.

Comparative Example C

Comparative Example C was produced in a two step process stirred gas phase process. In the first stage, a propylene/ethylene random copolymer with an ethylene content of 1.8 wt-% was polymerized in gas phase. Comparative Example C was produced without the injection of propylene, but with a higher amount of hydrogen in the second reactor. As a consequence, a K-value (the ratio of the second reactor powder MFR to the first reactor powder MFR) of 1.92 was achieved, which was higher than in Example 1.

The ratio between the propylene/ethylene random copolymer and the propylene/ethylene rubber was 85:15 (parts by weight).

The polymer powder obtained in the polymerization was admixed with a standard additive mixture in the extrusion step. The polymer was compounded in a twin screw extruder at 250° C. The polymer composition obtained contained 0.1% by weight of Irgafos 168 (from Ciba SC), 0.05% by weight of Irganox 1010 (from Ciba SC), 0.11% by weight of calcium stearate (from Baerlocher), 0.06% by weight of Atmer 122 (from Ciba SC) and 0.2% by weight of Millad 3988 (from Milliken Chemical).

For visbreaking from the powder melt flow rate of 2.5 g/10 min to the final melt flow fate of 15 g/10 min, 2,5-dimethyl-2,5-di(tert-butylperoxy)hexane was used.

In spite of having a positive $\Delta MFR_{R2-R1}$ (very low molecular weight of the rubber phase), the resulting haze of the product of Comparative Example C was higher than that achieved in Example 1 as a result of a lower amount of ethylene in the random copolymer of the first stage, and a more incompatible rubber phase in the second stage of the polymerization.

Other operative conditions of the produced polymer are indicated in Table 1.

COMMERCIAL COMPARATIVE EXAMPLES

3240NC and 3348SC are designations of random copolymers commercially available from Novolen Technology.

3240NC and 3348SC were both produced in a single gas phase reactor. 3240NC is a propylene/ethylene random copolymer with 2.2 wt-% ethylene. 3348 SC is a propylene/ethylene random copolymer with 3 wt-% ethylene.

The polymer powder obtained in the polymerization was admixed with a standard additive mixture in the extrusion step. The polymers were compounded in a twin screw extruder at 250° C. The polymer composition of 3240 NC contained 0.1% by weight of Irgafos 168 (from Ciba SC), 0.05% by weight of frganox 1010 (from Ciba SC), 0.11% by weight of calcium stearate (from Baerlocher), 0.06% by weight of Atmer 122 (from Ciba SC) and 0.2% by weight of Millad 3988 (from Milliken Chemical) as clarifying agent. 3348 SC contains additionally 0.2% Atmer 122 as antielectrostatic agent.

For visbreaking from the powder melt flow rate to the final melt flow rate of about 12 g/10 min for 3240NC and 25 g/10 min for 3348SC, 2,5-dimethyl-2,5-di(tert-butylperoxy)hexane was used.

Examples presented in Table 1 clearly show that only by carefully tailoring molecular parameters, such as matrix ethylene content, rubber composition and rubber molecular weight, a very low haze value can be obtained by adding a rubber phase to a random copolymer matrix.

Careful control and balancing of those parameters results in the growth of crystalline regions of a certain size and type, resulting in an random block copolymer that has an unexpectedly low haze, which is desirable yet previously thought to be impossible for impact copolymers.

Table 2 shows this fact, where contrary to conventional expectations, increasing rubber content, as shown by increasing XS values, can result in lower haze values.

Starting from a random copolymer with a haze value of about 11%, the incorporation of a properly designed rubber phase leads to an increasing improvement in transparency while the amount of such rubber phase, measured by the Xs content, is increased. In this way and following the polymerization parameters already presented in Example 1 (Table 1) it was possible to achieve a final haze about half the starting value. There are no significant changes in product melting point since the random copolymer matrix has the same ethylene content.

TABLE 2

Haze reduction by rubber incorporation to a Random copolymer matrix

|  | XS (%) | Haze (%) | Tm (° C.) |
|---|---|---|---|
| Start Random | 8.5 | 11.0 | 143 |
|  | 12.6 | 10.0 | 143 |
|  | 12.8 | 9.2 | 143 |
|  | 14.4 | 8.3 | 142 |
|  | 15.3 | 6.0 | 142 |
|  | 16.9 | 5.8 | 142 |
| Example 1 | 17.2 | 5.8 | 142 |

Although not wishing to be limited to any theory, the low haze is believed to be the result of properly formed crystalline domains of smaller size and type than those found in typical random copolymers. This behavior is believed to be attributable to co-crystallization of rubber chains within the matrix chains. Smaller, more open spherulites with irregular borders in combination with very small rubber particles (<0.4 μm) are believed to provide a mechanism for obtaining the unique balance of low haze and good impact properties in the random block copolymer of the invention. Also, low molecular weight (LMW) compatible rubber tends to migrate to the matrix domain thereby thickening the amorphous lamella (La) and thinning the crystalline lamella (Lc). This effect is presented in Table 3.

TABLE 3

|  | Haze (%) | Crystalline to Amorphous Spacing Ratio (Lc/La) | Long Spacing Lp (Å) |
|---|---|---|---|
| Example 1 | 5.8 | 1.5 | 129 |
| 3240NC | 11 | 2.3 | 139 |

The random block copolymer of the invention (Example 1) has smaller long spacing (Lp) and lower crystalline to amorphous spacing ratio (Lc/La), which correlates to a decrease in haze. These results suggest that the structure of copolymer A and the presence of copolymer B of the present invention tend to reduce the size of crystallites by disrupting their structure through co-crystallization.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

What is claimed is:

1. A method of making a random block copolymer comprising:
   a) introducing into a first reaction zone a polymerization catalyst and a first feed containing from about 0.5 parts by weight to about 6 parts by weight of ethylene and from about 94 parts by weight to about 99.5 parts by weight propylene;
   b) copolymerizing the ethylene and propylene under first polymerization reaction conditions to provide a copolymer A with active catalyst embedded therein;
   c) introducing the copolymer A into a second reaction zone;
   d) introducing to the second reaction zone a second feed containing from about 8 parts by weight to about 40 parts by weight of ethylene and from about 60 parts by weight to about 92 parts by weight propylene;
   e) copolymerizing the ethylene and propylene of the second feed to provide a copolymer B wherein the copolymer B is copolymerized with the copolymer A under second polymerization reaction conditions and in such proportion as to provide a random block copolymer containing from about 75 wt. % to about 95 wt. % blocks of copolymer A and about 5 wt. % to about 25 wt. % blocks of copolymer B.

2. The method of claim 1 wherein:
   the first feed contains from about 1 parts by weight to about 5 parts by weight of ethylene and from about 95 parts by weight to about 99 parts by weight propylene,
   the second feed contains from about 10 parts by weight to about 30 parts by weight of ethylene and from about 70 parts by weight to about 90 parts by weight propylene, and
   the random block copolymer contains from about 75 wt. % to about 95 wt. % blocks of copolymer A and about 5 wt. % to about 25 wt. % blocks of copolymer B.

3. The method of claim 1 wherein:
   the first feed contains from about 1.5 parts by weight to about 4.5 parts by weight of ethylene and from about 95.5 parts by weight to about 98.5 parts by weight propylene, the second feed contains from about 10 parts by weight to about 30 parts by weight of ethylene and from about 70 parts by weight to about 90 parts by weight propylene, and
   the random block copolymer contains from about 80 wt. % to about 92 wt. % blocks of copolymer A and about 8 wt. % to about 20 wt. % blocks of copolymer B.

4. The method of claim 1 wherein
   the first feed contains from about 2 parts by weight to about 4 parts by weight of ethylene and from about 96 parts by weight to about 98 parts by weight propylene,
   the second feed contains from about 12 parts by weight to about 17 parts by weight of ethylene and from about 83 parts by weight to about 88 parts by weight propylene, and
   the random block copolymer contains from about 88 wt. % to about 92 wt. % blocks of copolymer A and about 8 wt. % to about 12 wt. % blocks of copolymer B.

5. The method of claim 1 wherein the catalyst is a Ziegler-Natta catalyst or metallocene catalyst.

6. The method of claim 1 wherein both the first polymerization reaction and the second polymerization reaction are carried out in a stirred bed gas phase process.

7. The method of claim 1 wherein the first polymerization reaction is a bulk polymerization process conducted in liquefied propylene.

8. The method of claim 7 wherein the second polymerization reaction is a gas phase process and the second reaction zone includes a fluidized bed or stirred bed.

9. The method of claim 1 wherein the first and/or second polymerization reaction conditions include a temperature of from 20 to 150° C., a pressure of from 1 to 100 bar, and an average residence time of from 0.5 to 5 hours.

10. The method of claim 1 wherein the first and/or second polymerization reaction conditions include a temperatures of from 60 to 90° C., a pressure of from 10 to 50 bar, and an average residence time of from 0.5 to 3 hours.

11. The method of claim 2 further comprising the introduction of hydrogen into the first and/or second polymerization reaction zone.

12. The method of claim 1 wherein the polymerization catalyst comprises a Ziegler-Natta catalyst.

13. A method of making a random block copolymer comprising:
   a) introducing into a first reaction zone a polymerization catalyst and a first feed containing from about 0.5 parts by weight to about 6 parts by weight of ethylene and from about 94 parts by weight to about 99.5 parts by weight propylene;
   b) copolymerizing the ethylene and propylene under first polymerization reaction conditions to provide a copolymer A with active catalyst embedded therein;
   c) introducing the copolymer A into a second reaction zone;
   d) introducing to the second reaction zone a second feed containing from about 8 parts by weight to about 40 parts by weight of ethylene and from about 60 parts by weight to about 92 parts by weight propylene;
   e) copolymerizing the ethylene and propylene of the second feed to provide a copolymer B wherein the copolymer B is copolymerized with the copolymer A under second polymerization reaction conditions and in such proportion as to provide a random block copolymer containing from about 65 wt. % to about 97 wt. % blocks of copolymer A and about 3 wt. % to about 35 wt. % blocks of copolymer B; and
   wherein the polymerization catalyst comprises a Ziegler-Natta catalyst.

* * * * *